United States Patent
Lee (10) Patent No.: US 10,813,110 B2
(45) Date of Patent: Oct. 20, 2020

(54) METHOD AND APPARATUS FOR SCHEDULING TERMINAL RADIO RESOURCES

(71) Applicant: SK TELECOM CO., LTD., Seoul (KR)

(72) Inventor: Dongjin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 22 days.

(21) Appl. No.: 16/327,614

(22) PCT Filed: Sep. 8, 2017

(86) PCT No.: PCT/KR2017/009866
§ 371 (c)(1),
(2) Date: Feb. 22, 2019

(87) PCT Pub. No.: WO2018/066823
PCT Pub. Date: Apr. 12, 2018

(65) Prior Publication Data
US 2019/0191447 A1    Jun. 20, 2019

(30) Foreign Application Priority Data

Oct. 7, 2016   (KR) .................. 10-2016-0129654

(51) Int. Cl.
*H04L 5/00* (2006.01)
*H04W 72/12* (2009.01)
(Continued)

(52) U.S. Cl.
CPC ....... *H04W 72/1231* (2013.01); *H04L 45/745* (2013.01); *H04W 74/08* (2013.01); *G06F 16/2282* (2019.01)

(58) Field of Classification Search
CPC ............. H04W 72/1231; H04W 74/08; H04W 28/0236; H04L 45/745; G06F 16/2282
See application file for complete search history.

(56) References Cited

U.S. PATENT DOCUMENTS

2004/0038686 A1* 2/2004 Buot .................. H04W 72/085
455/453
2006/0251013 A1  11/2006 Roy et al.
(Continued)

FOREIGN PATENT DOCUMENTS

| KR | 10-2002-0021577 | 3/2002 |
|----|-----------------|--------|
| KR | 10-1283209      | 7/2013 |
| KR | 10-2016-0115072 | 10/2016|

OTHER PUBLICATIONS

International Search Report dated Dec. 15, 2017 issued in Application No. PCT /KR2017 /009866.
(Continued)

*Primary Examiner* — Lan-Huong Truong
(74) *Attorney, Agent, or Firm* — Ked & Associates, LLP (57) ABSTRACT

A method and an apparatus for scheduling radio resources for a terminal are disclosed. The present disclosure in some embodiments provides a method and apparatus which predict fluctuations in the latency that may occur at the time of packet transfer between the terminal and a server in the mobile communication network, select the radio resource to be allocated for the terminal, and transmit information thereon to the server and the terminal, whereby maximizing the efficiency of packet transfer between the terminal and the server.

15 Claims, 7 Drawing Sheets

(51) Int. Cl.
*H04L 12/741* (2013.01)
*H04W 74/08* (2009.01)
*G06F 16/22* (2019.01)

(56) References Cited

U.S. PATENT DOCUMENTS

| | | |
|---|---|---|
| 2015/0029950 A1 | 1/2015 | Rath et al. |
| 2016/0113031 A1 | 4/2016 | Sun et al. |
| 2016/0142308 A1* | 5/2016 | Gage ................. H04L 45/74 370/392 |
| 2017/0373890 A1* | 12/2017 | Fertonani ............... H04L 25/02 |

OTHER PUBLICATIONS

Korean Office Action dated Nov. 25, 2019 issued in Application No. 10-2016-0129654.

* cited by examiner

| Flow-Table | | | | | |
|---|---|---|---|---|---|
| Key | Value | | | | |
| | Packets | Bytes | EL | [Other fields] | Air BW (e.g, initrwnd) |
| 0xD4CA | 1 | 64B | 0 | ... | 0 |
| 0xA2BB | 2 | 128B | 52.2ms | ... | 10Mb/s |
| 0x71CC | 9 | 800B | 86.1ms | ... | 30Mb/s |

(a)

| Ruleset-Table | | | | | |
|---|---|---|---|---|---|
| Key or Flow_Content Type | | Threshold (>,<, and, or, Nested) | | | |
| | | Packets | Bytes | EL | [Other fields] |
| 0xD4CA | srcIP, dstIP, srcPort, dstPort, Protocol, etc | 2 | 100B | 20ms | ... |
| 0xA2BB | srcIP, dstIP, srcPort, dstPort, Protocol, etc | 4 | 380B | 40ms | ... |
| 0x71CC | srcIP, dstIP, srcPort, dstPort, Protocol, etc | 10 | 700B | 100ms | ... |

METHOD AND APPARATUS FOR SCHEDULING TERMINAL RADIO RESOURCES

TECHNICAL FIELD

The present disclosure in some embodiments relates to a method and an apparatus for scheduling radio resources of a terminal. More particularly, some embodiments of the present disclosure relate to a method and apparatus for scheduling radio resources for allocation to a terminal (or a user equipment) in consideration of a latency time of the terminal's traffic transmitted in real time via a radio access network (RAN).

BACKGROUND

The statements in this section merely provide background information related to the present disclosure and do not necessarily constitute prior art.

Figure 1:
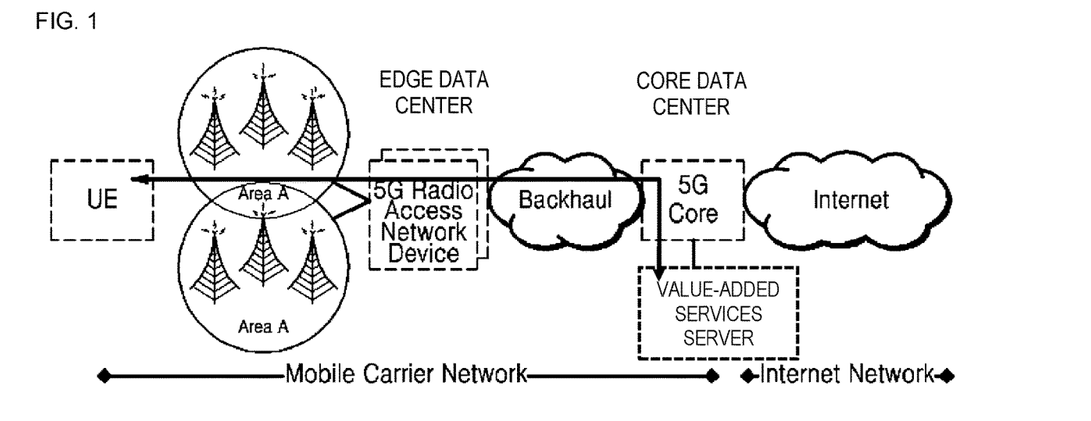
FIG. 1 is a diagram of an example network configuration of mobile communication networks, in particular LTE and 5G networks.

In the mobile communication network, terminals and server know the IP addresses for mutual communication, and they use the same to send and receive IP packets to each other. FIG. 1 illustrates a network configuration diagram of mobile communication networks, in particular Long Term Evolution (LTE) and Fifth Generation (5G) networks. Referring to FIG. 1, a method of transmitting IP packets will be described. IP packets in the radio section are transferred via a RAN device in accordance with the LTE standard to a core which transmits the IP packets based on the IP addresses to the corresponding server.

Conventionally, the server determined the IP packet transfer rate, etc. in consideration of information on the end-to-end round trip time (RTT) between the terminal (or the user equipment) and the server. However, as shown in FIG. 1, the section, which is in a wireless configuration, between the terminal and the radio access network device or RAN device, is affected by the radio wave environment. The server has difficulty in predicting factors such as the radio resources and the latency time, which are rapidly changing depending on the radio wave environment, which directly hampers realizing the maximum transmission efficiency of the IP packet between the server and the terminal.

A recently proposed solution to such a problem is a scheme to directly inform the server of available radio resources for the section between the terminal and the RAN device. However, when implementing the proposed method, the process of transmitting information on the available radio resources to the server already involves a certain latency. As a result, when the information on the available radio resources actually arrives at the server, the latency time proportionally deteriorates the accuracy of the radio resource availability. In order to realize the maximum transmission efficiency of the IP packet, the server further needs to carry out a process of reestimating available radio resources for the section between the terminal and the RAN device, where another deterioration in the IP packet transmission efficiency will occur due to an increased load in the server.

DISCLOSURE

Technical Problem

The present disclosure in some embodiments seeks to provide a method and apparatus for selecting radio resources for allocation to a terminal by predicting a fluctuation in latency time that may occur at the time of packet transfer between a terminal and a server in a mobile communication network, and informing the server and the terminal of the allocation, and thereby maximize the efficiency of packet transfer between the terminal and the server.

Summary

At least one aspect of the present disclosure provides a radio resource scheduling apparatus including a communication unit, a latency calculation unit, a scheduling unit and a control unit. The communication unit is configured to receive an uplink packet transmitted from a terminal to a server device via a radio access network (RAN) device. The latency calculation unit is configured to calculate an expected latency from when the uplink packet is transferred from the RAN device to the server device, to when a downlink packet is transferred in response to the uplink packet, from the server device via the RAN device to the terminal. The scheduling unit is configured to select a radio resource to be allocated to the terminal by reflecting the expected latency, and to transmit information on radio resource allocation for the terminal with the information being carried on the uplink packet to the server device. The control unit is configured to control operations of the latency calculation unit and the scheduling unit.

Another aspect of the present disclosure provides a method performed by a radio resource scheduling apparatus for scheduling and providing radio resources for a terminal that is linked with a radio access network (RAN) device. The method includes receiving an uplink packet transmitted from the terminal to a server device via the RAN device, and calculating an expected latency from when the uplink packet is transferred from the RAN device to the server device, to when a downlink packet is transferred in response to the uplink packet, from the server device via the RAN device to the terminal, and selecting a radio resource to be allocated to the terminal by reflecting the expected latency, and transmitting information on radio resource allocation for the terminal with the information being carried on the uplink packet to the server device.

Advantageous Effects

As explained above, according to some embodiments, radio resources are selected for allocation to a terminal by predicting a fluctuation in latency that may occur at the time of packet transfer between a terminal and a server in a mobile communication network, and the server and the terminal are informed of the allocation, and thereby the efficiency of packet transfer is maximized between the terminal and the server.

Further, some embodiments enable to promptly play media and high image quality video at the time of streaming without delay by initial loading thereof, thereby providing an enhanced user experience and maximized efficiency of network resources and performance.

DETAILED DESCRIPTION

Hereinafter, some embodiments of the present disclosure will be described in detail with reference to the accompanying drawings.

Figure 2:
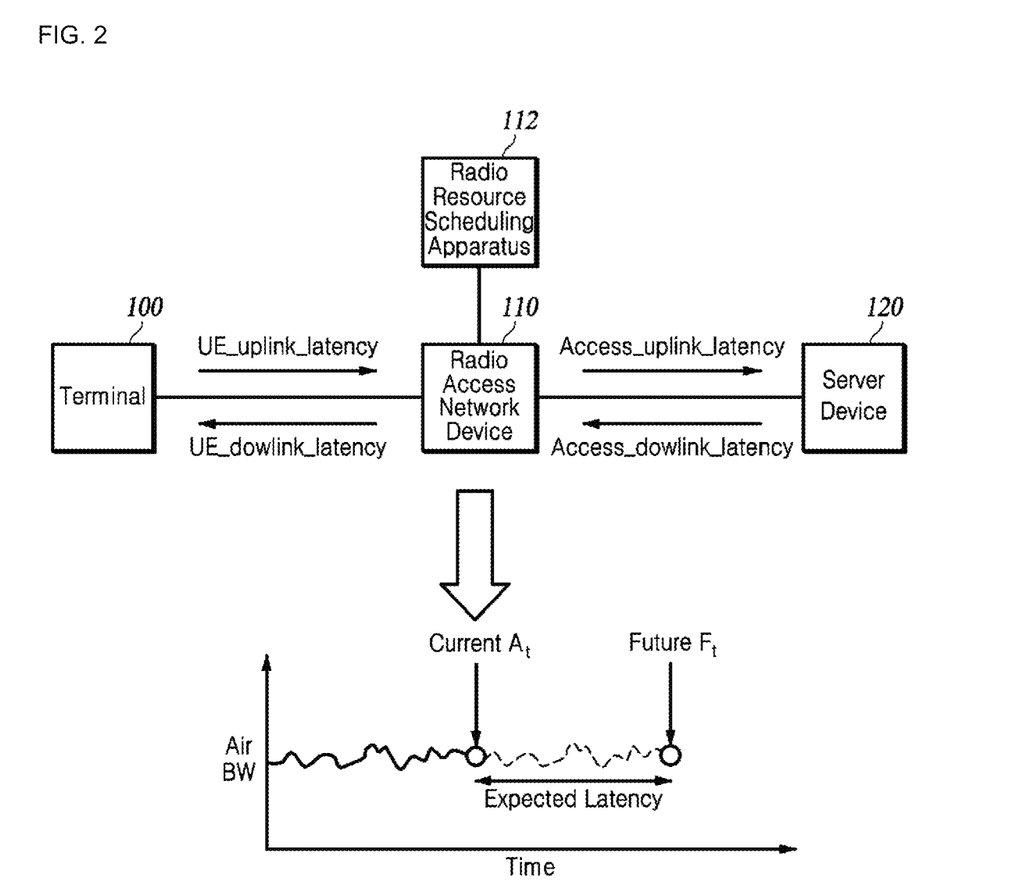
FIG. 2 is a schematic block diagram of a network configuration of a mobile communication system according to some embodiments of the present disclosure.

FIG. 2 is a schematic block diagram of a network configuration of a mobile communication system according to some embodiments.

The mobile communication system according to some embodiments includes a terminal 100, a radio access network (RAN) device 110, a radio resource scheduling apparatus 112 and a server device 120. This does not limit the components to be included in the mobile communication system according to some embodiments. For example, the radio resource scheduling apparatus 112 may be integrated with the RAN device 110 into a single device.

The terminal 100 refers to a terminal capable of sending and receiving various data to and from the server device 120 via the network according to the key operation by the user, and it may be one of a tablet PC, a laptop, a personal computer (PC), a smart phone, a personal digital assistant (PDA) and a mobile communication terminal.

In other words, the terminal 100 is a terminal that performs voice and data communications by using a network, and includes a memory for storing programs or protocols for communicating with the server device 120 via the network, and a microprocessor or the like for executing the relevant program and performing calculation and control. As long as the terminal 100 can perform server-client communication with the server device 120, it may be any terminal envisioned to encompass in a broadest sense, any computing devices such as a notebook computer, a mobile communication terminal, a PDA, etc. Such terminal 100 may connect to the RAN device 110 through a wireless interface.

The terminal 100 according to some embodiments is provided with radio resource allocation information of the terminal 100 from the radio resource scheduling apparatus 112. Thereafter, the terminal 100 communicates with the RAN device 110 based on the radio resource allocation information. The fact that the terminal 100 of some embodiments communicates with the RAN device 110 based on the radio resource allocation information from the radio resource scheduling apparatus 112 helps to maximize the efficiency of packet transfer between the terminal 100 and the server device 120.

The RAN device 110 carries out functions such as radio frequency (RF) conversion of transmission signals, transmission/reception, measurement of signal strength, quality measurement, baseband signal processing and channel card resource management. The RAN device 110 is a transmitter in the network, and performs operations necessary for wireless call processing such as location registration, radio channel assignment, handoff and such various functions in the network. Incidentally, in some embodiments, the RAN device 110 may be an eNB or a device used to access to a radio access network (RAN).

The RAN device 110 interlocks with the scheduling device 112 with information shared therebetween. The RAN device 110 according to some embodiments provides the radio resource scheduling apparatus 112 with relevant information for scheduling the radio resources of the terminal 100. For example, the RAN device 110 sends the radio resource scheduling apparatus 112 an uplink packet which is transmitted from the terminal 100 via the RAN device 110 to the server device 120.

The RAN device 110 may provide the radio resource scheduling apparatus 112 with information related to the terminal that is or was in connection with the RAN device 110. For example, the RAN device 110 may inform on the radio wave environment of the current terminal in connection with the RAN device 110.

The radio resource scheduling apparatus 112 refers to a device that schedules the radio resources for terminals linked with the RAN device 110. The radio resource scheduling apparatus 112 according to some embodiments predicts, for each of the terminals linked with the RAN device 110, a possible fluctuation in latency that may occur in each section of a mobile communication network in the process of packet transfer between each terminal and the server device 120, and it selects the radio resource for allocation to the terminal by reflecting the predicted result.

The radio resource scheduling apparatus 112 receives the uplink packet transmitted from the terminal 100 via the RAN device 110 to the server device 120. The uplink packet may be an acknowledgement (ACK) packet transmitted by the terminal 100 to the RAN device 110 in response to a downlink packet transmitted from server device 120.

The radio resource scheduling apparatus 112 predicts a fluctuation in a latency that may occur during the procedure of a traffic processing flow based on the uplink packet between the terminal 100 and the server device 120. Meanwhile, as described above, wireless networked section between the terminal 100 and the RAN device 110 is susceptible to abrupt fluctuations in, for example, radio resources and latency. In addition to this, Edge DC, backhaul and the Internet backbone network existing between the RAN device 110 and the server device 120 follow suit to undergo abrupt fluctuations in radio resources, latency and the like due to their usage rates changed over time. In response, the radio resource scheduling apparatus 112 according to some embodiments calculates an expected latency (EL) from when the received uplink packet is transferred from the RAN device 110 to the server device 120, to when the downlink packet is transferred in response to the uplink packet, from the server device 120 via the RAN device 110 to the terminal 100.

The radio resource scheduling apparatus 112 selects the radio resources for allocation to the terminal 100 reflecting the calculated expected latency. As shown by the graph in FIG. 2, the radio resource scheduling apparatus 112 predicts and provides radio resources to be allocated to the terminal 100 at a future time point (t+EL) after a lapse of the calculated EL from the time point (t) at which the uplink packet is transferred by the RAN device 110 to the server device 120. This means that the radio resource scheduling apparatus 112 selects, from this point in time forward, the radio resource for allocation to the terminal 100 by fully taking account of fluctuations in latency that may occur during the procedure of the traffic processing flow between the terminal 100 and the server device 120.

The radio resource scheduling apparatus 112 provides radio resource allocation information of the terminal 100 to the terminal 100 and the server device 120. For example, the radio resource scheduling apparatus 112 transmits information on the radio resource allocation for the terminal 100 as being carried on the uplink packet to the server device 120. Thereby, the server device 120 according to some embodiments can thereafter transmit the best acceptable traffic to the terminal 100 regardless of variations in the latency that may occur in the process of transferring the traffic between the server device 120 and the terminal 100. Likewise, the terminal 100 may also receive the most acceptable traffic therefor without any other latency. In other words, with the radio resource scheduling apparatus 112 according to some embodiments, low latency and high throughput are realized in the traffic processing process between the terminal 100 and the server device 120.

A method of selecting a radio resource to be allocated to the terminal 100 by the radio resource scheduling apparatus 112 will be described below in detail with reference to FIG. 3.

The server device 120 is a type of server that stores and manages contents to be transmitted to the terminal 100. The server device 120 provides the terminal 100 with the content, corresponding to the traffic request signal transmitted from the terminal 100, as included in a traffic response signal. The server device 120 transmits the traffic response signal to the terminal 100 via the RAN device 100. Here, the content may include at least one piece of text data, image data and video data. In terms of hardware, such a server device 120 have the same architecture as ordinary Web servers or network servers. In terms of software, it includes program modules implemented via languages such as C, C++, Java, Visual Basic, Visual C, etc. The server device 120 may be implemented in the form of a Web server or a network server. The Web server refers to a computer system which is generally linked with a plurality of clients and/or other servers via an open computer network such as the Internet, and is adapted to receive a task execution request from a client or another Web server, and to derive and provide the processed result, as well as computer software (Web server program) installed therefor.

When the server device 120 according to some embodiments receives an uplink packet inclusive of information on the radio resource allocation for the terminal 100 from the RAN device 110, it specifies the size and number of downlink packets to be transferred to the terminal 100 based on the radio resource allocation information. Thereafter, the server device 120 transmits downlink packets of the specified size and number to the terminal 100 via the RAN device 110.

In another embodiment, the server device 120 can specify the size and the number of downlink packets to be transferred to the terminal 100 even when the uplink packet (=current uplink packet) received from the RAN device 110 does not include the radio resource allocation information for the terminal 100. For example, the server device 120 can specify the size and the number of downlink packets to be transferred to the terminal 100 by using the radio resource allocation information included in the previous uplink packet corresponding to the current uplink packet, among other uplink packets transmitted before the current uplink packet. At this time, the previous uplink packet may be a specific uplink packet having similar attributes to those of the target uplink packet, and the attribute value may be set with various information including IP subnet, terminal information, position, time, etc. The similarity of attributes means that the attribute values are within a predetermined error range. This enables the server device 120 to omit the process of separately specifying the size and number of downlink packets to the terminal 100 for which the optimum traffic value is already determined. Likewise, the radio resource scheduling apparatus 112 can be saved from performing the process of scheduling radio resources of such terminal 100 in vain.

Figure 3:
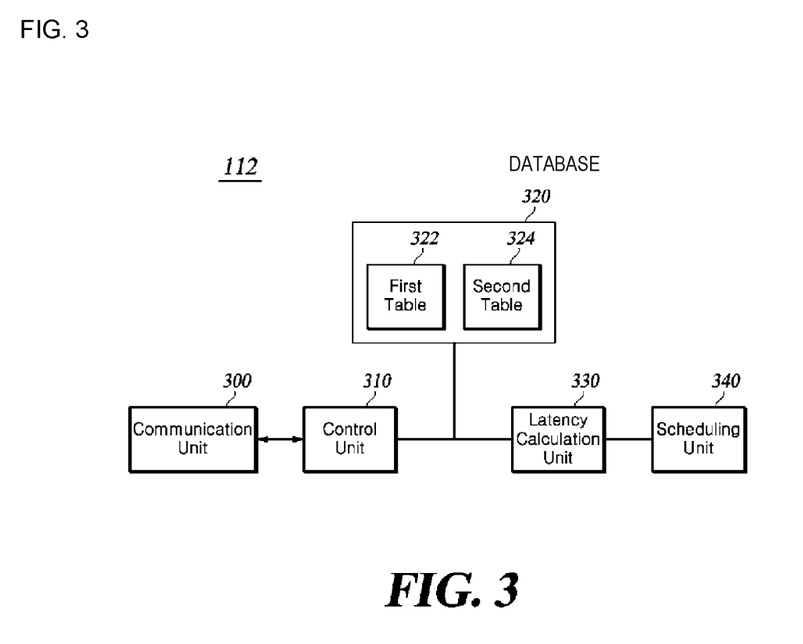
FIG. 3 is a schematic block diagram of a radio resource scheduling apparatus according to some embodiments.

FIG. 3 is a schematic block diagram of a radio resource scheduling apparatus according to some embodiments.

The radio resource scheduling apparatus 112 according to some embodiments includes a communication unit 300, a control unit 310, a database 320, a latency calculation unit 330 and a scheduling unit 340. On the other hand, the radio resource scheduling apparatus 112 according to some embodiments is implemented as a separate individual device, but it may be implemented as a software device on the RAN device 110. In that case, when the software device is driven, the functional modules described above can sequentially realize their functions.

The communication unit 300 refers to a device for transmitting/receiving data to/from an external device. The communication unit 300 according to some embodiments receives an uplink packet transmitted from the terminal 100 to the server device 120 via the RAN device 110.

The communication unit 300 may directly communicate with the terminal 100 and receive the uplink packet. In another embodiment, the communication unit 300 communicates with the RAN device 110 and receives the transmitted uplink packet to the RAN device 110.

The control unit 310 serves to perform controlling the operation of each functional module included in the radio resource scheduling apparatus 112.

The control unit 310 uses, upon receiving the uplink packet via the communication unit 300, a first table 322 and a second table 324 included in the database 320 to determine whether or not to perform scheduling of the radio resources for the terminal 100. The control unit 310, upon determining to perform scheduling of the radio resources for the terminal 100, activates the latency calculation unit 330 and the scheduling unit 340.

The following will describe a method of determining by the control unit 310 whether or not to perform the scheduling of the radio resources for the terminal 100.

The control unit 310 calculates, upon receiving the uplink packet via the communication unit 300, the relevant information in the first table 322, corresponding to the uplink packet (hereinafter, explicitly described as corresponding relevant information), and the corresponding execution condition (hereinafter, explicitly described by this term) in the second table 324, corresponding to the uplink packet. The corresponding relevant information refers to relevant information to a specific uplink packet having the same attribute as the uplink packet. The corresponding execution condition refers to an execution condition matched with a specific uplink packet having the same attribute as the uplink packet.

The control unit 310 confirms whether or not the corresponding relevant information matches some or all of corresponding execution conditions, and based on the resultant confirmation, determines whether or not to perform scheduling of the radio resources for the terminal 100.

When the control unit 310 determines that the parameter value of the corresponding relevant information does not exceed the threshold values of parameters of some or all of the corresponding execution conditions, it controls to perform the scheduling process of the radio resources for the terminal 100.

More specifically, the control unit 310 confirms the threshold value set for the parameter of the corresponding execution condition that matches the parameter of the corresponding relevant information, and upon determining that the parameter value of the corresponding relevant information does not exceed the confirmed parameter threshold value of the corresponding execution condition, it controls to perform the scheduling processing of the radio resources for the terminal.

Meanwhile, when there is a plurality of corresponding relevant information, the control unit 310 repeatedly performs the confirmation process and the determination process on the parameter value of each corresponding relevant information. In this case, when it determines that some or all of the parameter values of the plurality of pieces of corresponding relevant information do not exceed the parameter threshold values of their respective matching corresponding execution conditions, the control unit 310 controls to perform the scheduling processing of the radio resources for the terminal 100.

However, when the control unit 310 determines that the parameter value of the corresponding relevant information exceeds the threshold value of the parameter of some or all of the corresponding execution conditions, it controls to hold performing a scheduling processing of the radio resources for the terminal 100.

When the control unit 310 determines that no corresponding relevant information is present corresponding to the uplink packet in the first table 322, it controls not to perform the radio resource scheduling process for the terminal 100.

On the other hand, when the control unit 310 determines that no corresponding relevant information is present corresponding to the uplink packet in the first table 322, it controls to generate a relevant information of the corresponding uplink packet in the first table 322 for the first time. Thereafter, the control unit 310 determines, based on the generated relevant information of the uplink packet and the corresponding execution condition corresponding to the uplink packet in the second table 324, whether or not to perform the radio resource scheduling process for the terminal 100. In this case, the corresponding execution condition corresponding to the uplink packet in the second table 324 may be an execution condition matched with a specific uplink packet having the same attribute as that uplink packet.

When the control unit 310 determines to perform the radio resource scheduling process for the terminal 100, it updates the corresponding relevant information stored in the first table 322, corresponding to the uplink packet.

When the control unit 310 determines not to perform the radio resource scheduling process for the terminal 100, it deletes the corresponding relevant information stored in the first table 322, corresponding to the uplink packet. For example, when the control unit 310 determines that the parameter value of the corresponding relevant information exceeds the threshold value of the parameter of some or all of the corresponding execution conditions, it determines that no additional radio resource scheduling process is necessary for the terminal 100, and deletes the corresponding relevant information corresponding to the uplink packet in the first table 322.

In another embodiment, the control unit 310 calculates, upon receiving the uplink packet via the communication unit 300, relevant information of a specific uplink packet having a similar attribute to that of the corresponding uplink packet in the first table 322, and performs the radio resource scheduling process for the terminal 100 based on the calculates relevant information. Meanwhile, the control unit 310 may perform the radio resource scheduling process for the terminal 100 by the above method, only when the previously received uplink packets via the communication unit 300 include no such previous uplink packet that has the same attribute as that of the currently received uplink packet. The control unit 310 may also be arranged to perform the radio resource scheduling process for the terminal 100 by the above method, only when receiving continuous uplink packets having attributes similar to each other.

The database 320 stores necessary information in the process of determining whether or not to perform the radio resource scheduling for the terminal 100 and in the process of performing the radio resource scheduling for the terminal 100.

The database 320 according to some embodiments includes the first table 322 and the second table 324.

The first table 322 stores the relevant information of the uplink packet transmitted from the terminal that is linked with the RAN device 110. The relevant information of the uplink packet may include the number of times of reception of the relevant uplink packet, a byte value, an expected latency calculated by the latency calculation unit 330 and the scheduling unit 340 based on the relevant packet, and radio resource allocation information for the terminal, and the like. In the present illustrative embodiments, the relevant information of the uplink packet is not limited to specific information.

In some embodiments, the relevant information of the uplink packet may be stored in the first table 322 after being categorized by purpose information, user information and service information corresponding to the uplink packet.

The second table 324 stores execution conditions for performing the radio resource scheduling for terminal after matching the execution conditions with each packet type. There may be a plurality of execution conditions for the performing of the radio resource scheduling for terminal, with each execution condition being designated with a specific threshold value. The threshold value may be variously determined within a range where the optimum radio resource allocation information can be calculated for the terminal 100. Meanwhile, the parameter of the execution condition of the uplink packet, which is stored in the second table 324 is preferably, but not necessarily, the same as the parameter of the relevant information of the uplink packet, which is stored in the first table 322.

The latency calculation unit 330 calculates the expected latency from when the received uplink packet via the communication unit 300 is transferred from the RAN device 110 to the server device 120, to when the downlink packet is transferred in response to the uplink packet, from the server device 120 via the RAN device 110 to the terminal 100.

The latency calculation unit 330 according to some embodiments calculates the expected latency by using the latency information collected based on the previous uplink packet having the same attribute as the currently received uplink packet, among the previously received uplink packets via the communication unit 300.

The latency calculation unit 330 calculates a first latency time between the RAN device 110 and the server device 120 by measuring, based on when the previous uplink packet was transmitted from the RAN device 110 to the server device 120, to when the downlink packet is transferred in response to the previous uplink packet, from the server device 120 to the RAN device 110.

The latency calculation unit 330 calculates a second latency time between the terminal 100 and the RAN device 110 based on a time stamp information included in the uplink packet which is transmitted from the terminal 100 to the RAN device 110 in response to the downlink packet transmitted to the terminal 100 via the RAN device 110 from the server device 120.

The latency calculation unit 330 calculates the sum of the first latency and the second latency as the expected latency.

The scheduling unit 340 selects radio resources to be allocated to the terminal 100 by reflecting the expected latency calculated by the latency calculation unit 330. Thereafter, the scheduling unit 340 transmits the uplink packet transmitted to the server device 120, with information on the radio resource allocation for the terminal 100 carried thereon.

Hereinafter, a method of selecting, by the scheduling unit 340, a radio resource for allocation to the terminal 100 will be described.

The scheduling unit 340 according to some embodiments calculates the average value of the previous radio resources which have been allocated to the terminal 100 in the time span between the current point (t) and a specific previous point in time (t−EL) selected based on the expected latency calculated by the latency calculation unit 330, and it selects radio resources to be allocated to the terminal 100 based on the calculated average value. In other words, the scheduling unit 340 utilizes the previous radio resources allocated to the terminal 100 in the past as a basis for calculating radio resources to be allocated to the terminal 100 in the future (t+EL). At this time, the expected latency is used as a factor for determining the range of the previous radio resources to be considered in the process of calculating the radio resource to be allocated to the terminal 100 in the future. Meanwhile, the scheduling unit 340 according to some embodiments has advance information on the selection range of the previous radio resources to be considered for each expected latency, and has such range in store.

The scheduling unit 340 may select the radio resource for allocation to the terminal 100 by using a moving average method. A method for selecting the radio resource for allocation to the terminal 100 by the scheduling unit 340 using the moving average method is as shown in Equation 1.

$$F_{t+EL} = \left( \frac{A_t + A_{t-1} + A_{t-2} + \ldots + A_{t-n+1}}{n} \right) \quad \text{Equation 1}$$

In Equation 1, t=0, At represents the radio resource of the terminal 100 at the present time, EL represents the expected latency, and n represents a constant value related to a specific previous time point selected based on the expected latency.

In other embodiments, the scheduling unit 340 uses not only the moving average method but also various methods such as weight moving average and exponential moving average for selecting the radio resource for allocation to the terminal 100.

Figure 4:
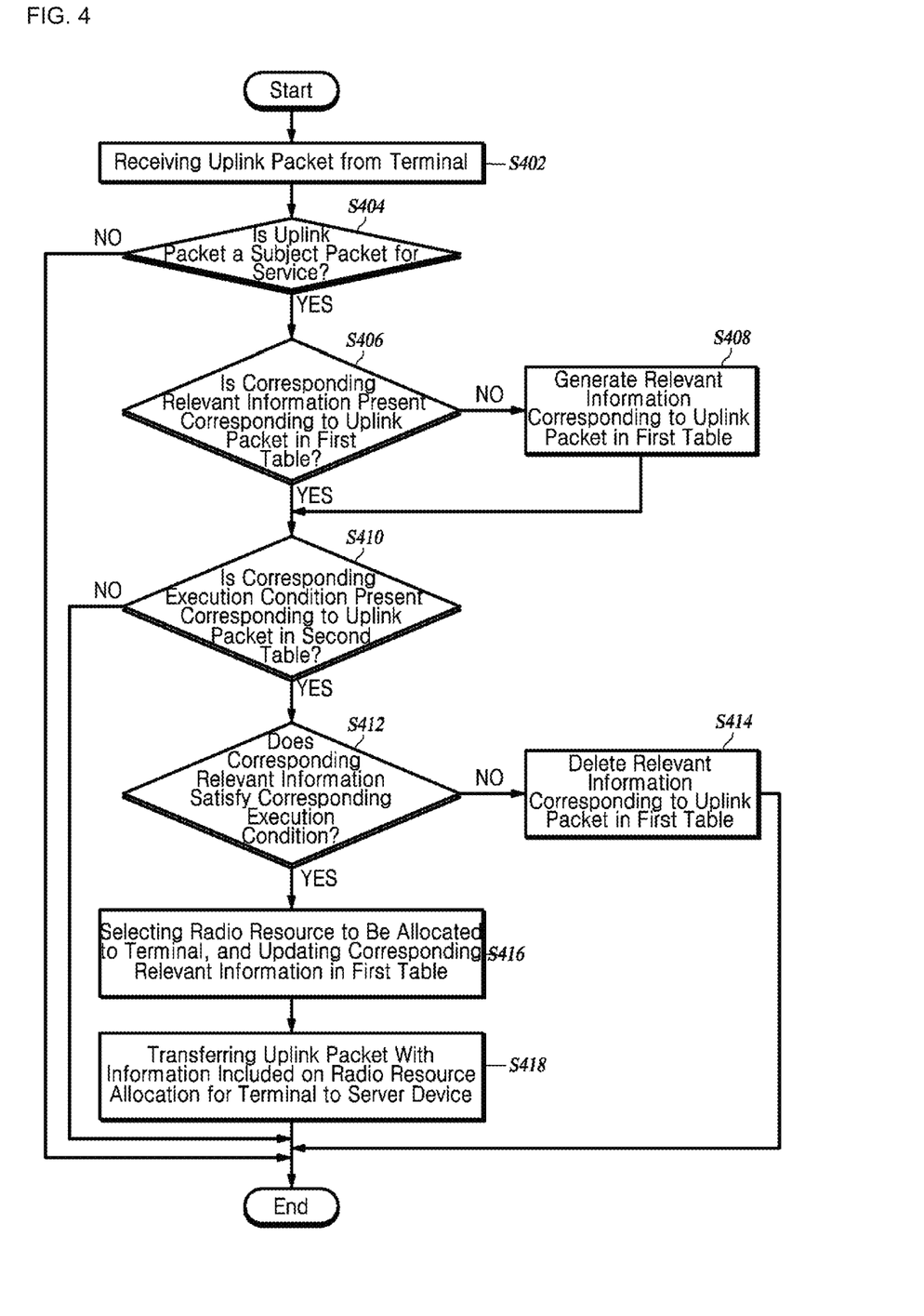
FIG. 4 is a flowchart of a radio resource scheduling method of a terminal according to some embodiments.

FIG. 4 is a flowchart of a radio resource scheduling method of a terminal according to some embodiments.

The radio resource scheduling apparatus 112 receives in Step S402, an uplink packet transmitted from the terminal 100 via the RAN device 110 to the server device 120.

The radio resource scheduling apparatus 112 determines whether the uplink packet received in Step S402 is the subject packet for service (S404). In Step S404, the subject packet for service may be determined in advance according to factors such as the IP address or other factors. When the radio resource scheduling apparatus 112 determines that the uplink packet is not the subject packet for service, it simply passes the uplink packet to the server device 120.

When the radio resource scheduling apparatus 112 determines that the uplink packet received in Step S402 is the subject packet for service, it confirms whether or not relevant information is present corresponding to the uplink packet in the first table 322 (S406).

When the radio resource scheduling apparatus 112 follows Step S406 negatively confirming to determine that no corresponding relevant information is present corresponding to the uplink packet in the first table 322, it controls to generate the relevant information of the corresponding uplink packet in the first table 322 for the first time (S408). Thereafter, the radio resource scheduling apparatus 112 performs the following flow procedure based on the relevant information of the corresponding uplink packet generated from Step S408.

The radio resource scheduling apparatus 112 checks whether a corresponding execution condition is present corresponding to the uplink packet in the second table 324 (S410). When the radio resource scheduling apparatus 112 follows Step S410 negatively confirming to determine that no corresponding execution condition is present corresponding to the uplink packet in the second table 324, it controls to simply pass the uplink packet to the server device 120.

When the radio resource scheduling apparatus 112 follows Step S410 positively confirming to determine that the corresponding execution condition is present corresponding to the uplink packet in the second table 324, it confirms whether or not the corresponding relevant information in Step S406 matches some or all of corresponding execution conditions in Step S410 (S412).

When the radio resource scheduling apparatus 112 follows Step S412 negatively confirming that no corresponding relevant information in Step S406 matches some or all of corresponding execution conditions in Step S410, it deletes the corresponding relevant information in Step S406 (S414).

When the radio resource scheduling apparatus 112 follows Step S412 positively confirming that the corresponding relevant information matches some or all of corresponding execution conditions, it selects the radio resource for allocation to the terminal 100 and updates the corresponding relevant information corresponding to the uplink packet in the first table (S416). In Step S416, the radio resource scheduling apparatus 112 confirms the threshold value set for the parameter of the corresponding execution condition that matches the parameter of the corresponding relevant information, and upon determining that the parameter value of the corresponding relevant information exceeds the confirmed parameter threshold value of the corresponding execution condition, it selects the radio resource for allocation to the terminal 100.

The radio resource scheduling apparatus 112 transfers the uplink packet with information included on the radio resource allocation for the terminal 100 to the server device 120 (S418).

FIG. 4 illustrates the respective steps as being sequentially performed, although it merely instantiates the technical idea of some embodiments of the present disclosure. In other words, various modifications, additions, and substitutions are possible by changing the illustrated sequence or by performing two or more of the steps in parallel, and hence the steps in FIG. 4 are not limited to the illustrated chronological sequence.

The respective steps shown in FIG. 4 can be implemented as computer-readable codes on a computer-readable recording medium. The computer-readable recording medium includes any type of recording device on which data that can be read by a computer system are recordable. Example computer-readable recording medium includes a magnetic recording medium (e.g., a ROM, a floppy disk, a hard disk, etc.), an optically readable medium (e.g., a CD-ROM, a DVD, etc.), and the like, and also include one implemented in the form of a carrier wave (e.g., transmission through the Internet). Further, the computer-readable recording medium can be distributed in computer systems connected via a network, wherein computer-readable codes can be stored and executed in a distributed manner.

Figure 5:
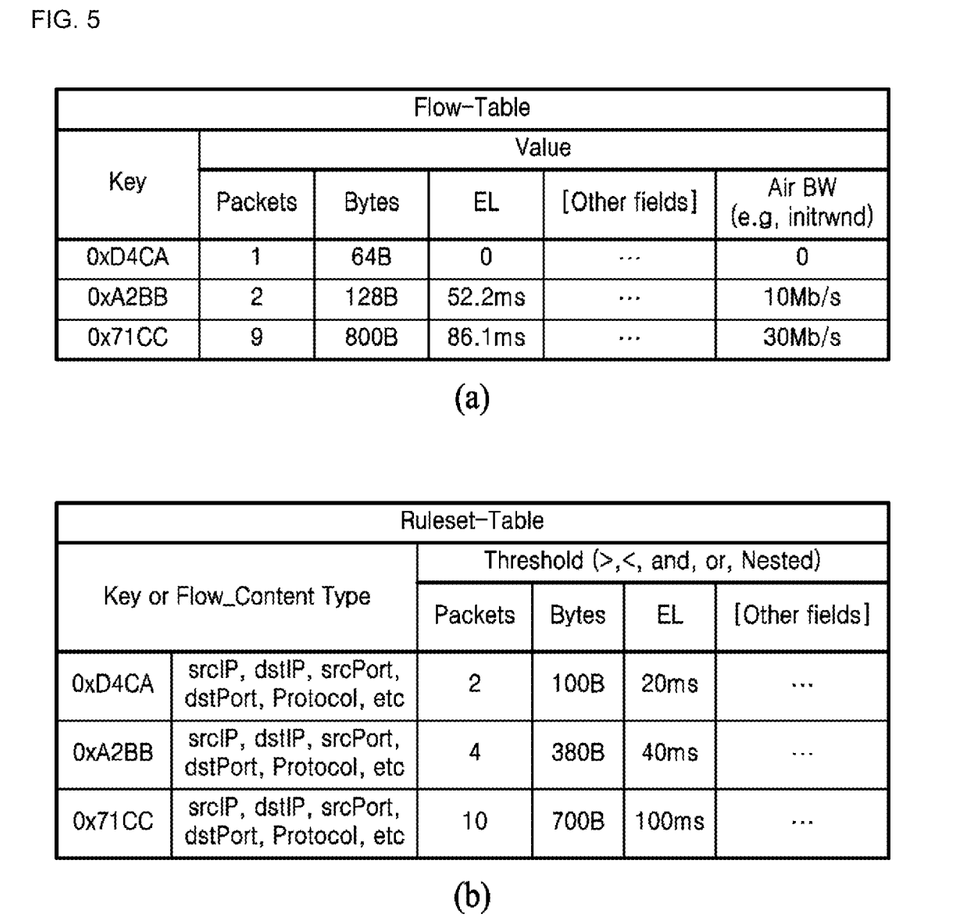
FIG. 5 is a diagram illustrating a first table and a second table according to some embodiments.

FIG. 5 is a diagram illustrating a first table and a second table according to some embodiments.

FIG. 5 shows at (a), an arrangement of the first table 322 storing the relevant information of the uplink packet transmitted from the terminal linked with the RAN device 110. For example, a 0xD4CA packet is the uplink packet transmitted from the terminal that accessed the RAN device 110 at first. Those collected and stored as the relevant information of the 0xD4CA packet, are just the number of times of reception of the packet and the byte value. 0xA2BB packet represents packet transmission twice with the same attribute to reach the RAN device 110. Those stored as the relevant information of the 0xA2BB packet, are the number of times of reception of the relevant packet, byte value, expected latency calculated by the latency calculation unit 330 and the scheduling unit 340 based on the relevant packet, information on the radio resource allocation for the terminal, and the like.

FIG. 5 shows at (b), an arrangement of the second table 324 storing execution conditions for performing the radio resource scheduling for terminal after matching the execution conditions with each packet type. For example, the arrangement has a 0xD4CA packet wherein parameters (=field values) of the execution conditions for scheduling the radio resource for the terminal are set as the number of times of reception of the packet, byte value and expected latency, for each of which a threshold is specified as illustrated.

Figure 6:
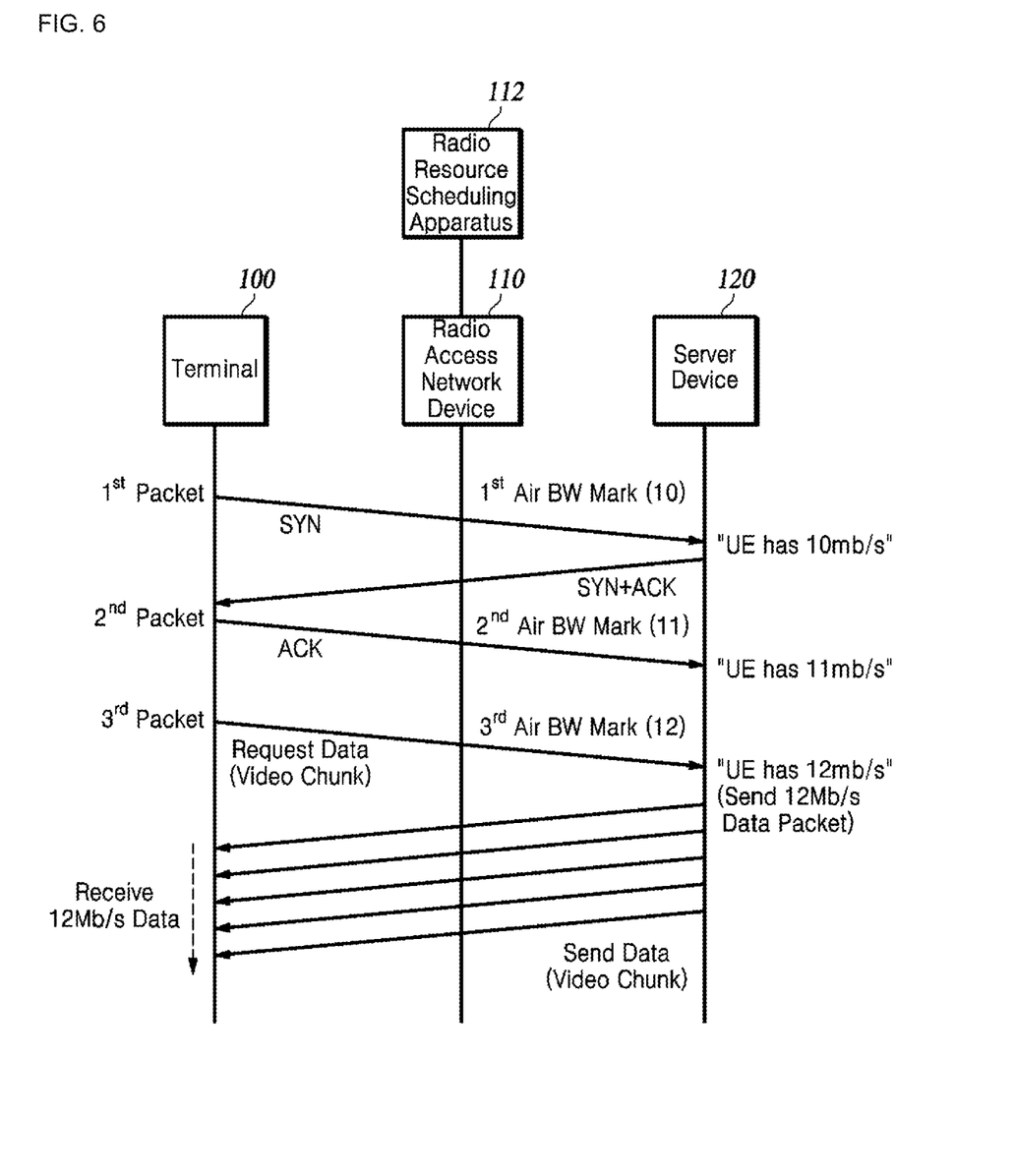
FIG. 6 is a diagram of an example packet transfer process based on the radio resource scheduling method of the terminal according to some embodiments.

FIG. 6 is a diagram of an example packet transfer process based on the radio resource scheduling method of the terminal according to some embodiments. In addition, FIG. 6 illustrates the process of performing the scheduling of the radio resources for the terminal 100 based on the number of times of reception of the uplink packet transmitted from the terminal 100.

The server device 120 generally transmits a data packet after receiving the third packet, and its subsequent packet is often a packet related to data coming down from the server device 120. With this considered, FIG. 6 illustrates the radio resource scheduling apparatus 112 performing the scheduling of the radio resources for the terminal 100 specifically with at most three receptions of the uplink packet transmitted from the terminal 100, although the number of times of reception is illustrative and not limiting.

FIG. 6 exhibits the radio resource scheduling apparatus 112 taking the 1st, 2nd and 3rd uplink packets as being transmitted from the terminal 100 via the RAN device 110 to the server device 120, to carry thereon information on the radio resource allocation for the terminal 100. The radio resource scheduling apparatus 112 determines that the uplink packet after the third uplink packet needs no further radio resource scheduling process for the terminal 100, and transmits those subsequent packets save information on the radio resource allocation for the terminal 100. Likewise, the server device 120 also specifies later, when in the procedure of the traffic processing flow with the terminal 100, the size and number of downlink packets to be transferred to the terminal 100 based on the information on the radio resource allocation for the terminal 100, which has been transmitted as being carried on the 3rd uplink packet.

Figure 7:
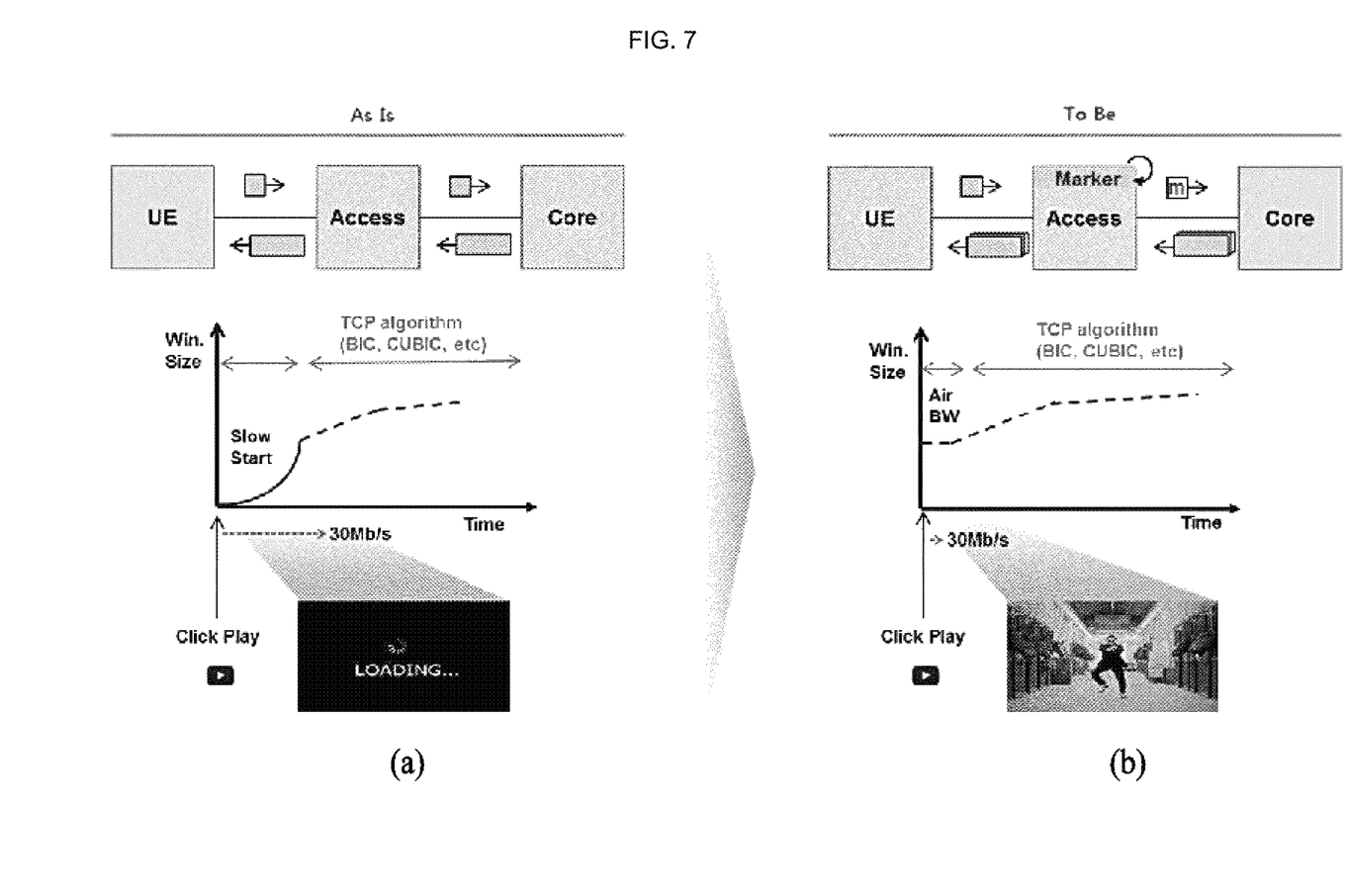
FIG. 7 is a diagram for explaining maximization of the packet transfer efficiency by the radio resource scheduling method of the terminal according to some embodiments.

FIG. 7 is a diagram for explaining maximization of the packet transfer efficiency by the radio resource scheduling method of the terminal according to some embodiments.

FIG. 7 illustrates at (a), a case where packets are transmitted by a terminal (or a user equipment) in a conventional radio resource scheduling method.

As shown by the (a) convention in FIG. 7, the server determines the packet transfer rate, etc. in consideration of information on the end-to-end RTT (Round Trip Time) between the terminal and the server device. Therefore, the server device is supposed to use a slow start mechanism for determining the packet transfer rate, since it is ignorant of the latency that may occur in the section between the terminal and the server device at the time of initially transmitting the packet. For example, the server device transmits just the minimum number of packets (e.g., at most 10 packets, up to 14 KB) during the initial packet transfer, and thereafter adjusts the number according to the ACK packet transmitted from the terminal. In this case, FHD/UHD class media requiring high bandwidth take considerable time before grasping the RTT information, which involves undesirable initial latency before the media can start a quick play.

FIG. 7 illustrates at (b), a radio resource scheduling method according at least one embodiment where packets are transmitted by a terminal.

As shown by the (b) embodiment in FIG. 7, the server device can immediately perform informed transmission of the maximum packet amount receivable by the terminal at once, since it possesses advance information on the latency that may occur in the section between the terminal and the server device. So, according to the present method of radio resource scheduling for the terminal in some embodiments, the terminal effects media streaming played immediately without initial loading latency.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, those skilled in the art would understand the scope of the claimed invention is not to be limited by the above explicitly described embodiments but by the claims and equivalents thereof.

REFERENCE NUMERALS

100: Terminal 110: Radio Access Network device
112: Radio resource scheduling apparatus 120: Server device
300: Communication unit 310: Control unit
320: Database 322: First memory
324: Second memory 330: Latency calculation unit
340: Scheduling unit

CROSS-REFERENCE TO RELATED APPLICATION

This application is a U.S. National Stage Application under 35 U.S.C. § 371 of PCT Application No. PCT/

KR2017/009866, filed Sep. 8, 2017, which claims priority under 35 U.S.C § 119(a) of Patent Application No. 10-2016-0129654, filed on Oct. 7, 2016 in Korea, the entire content of which is incorporated herein by reference. In addition, this non-provisional application claims priority in countries, other than the U.S., with the same reason based on the Korean patent application, the entire content of which is hereby incorporated by reference.

The invention claimed is:

1. A radio resource scheduling apparatus, comprising:
a communication unit configured to receive an uplink packet transmitted from a terminal to a server device via a radio access network (RAN) device; and
a control unit configured to:
calculate an expected latency from when the uplink packet is transferred from the RAN device to the server device to when a downlink packet is transferred in response to the uplink packet from the server device via the RAN device to the terminal;
select a radio resource to be allocated to the terminal based on the expected latency; and
manage the communication unit to transmit information on the radio resource to be allocated to the terminal with information being carried on the uplink packet from the RAN device to the server device.

2. The radio resource scheduling apparatus of claim 1, wherein the control unit is configured to calculate the expected latency by using a latency information collected based on a previous uplink packet corresponding to the uplink packet, among other uplink packets transmitted before the uplink packet.

3. The radio resource scheduling apparatus of claim 1, wherein the control unit is configured to
calculate an average value of previous radio resources which have been allocated to the terminal in a time span between a current point in time and a specific previous point in time selected based on the expected latency, and
select the radio resource to be allocated to the terminal based on the average value.

4. The radio resource scheduling apparatus of claim 1, further comprising:
a database comprising:
a first table that stores relevant information of the uplink packet transmitted from the terminal that is linked with the RAN device, and
a second table that stores information on execution conditions for transmitting the information on radio resource allocation after matching the execution conditions with each of a plurality of packet types.

5. The radio resource scheduling apparatus of claim 4, wherein the control unit is configured to:
calculate, upon receiving the uplink packet, relevant information in the first table, corresponding to the uplink packet, and an execution condition in the second table, corresponding to the uplink packet, and
determine when to calculate the expected latency, select the radio resource to be allocated to the terminal, and manage the communication unit to transmit information on the radio resource based on whether the relevant information corresponding to the uplink packet matches one or more of the execution conditions corresponding to the uplink packet.

6. The radio resource scheduling apparatus of claim 5, wherein the control unit is configured to:

upon determining that no relevant information is present corresponding to the uplink packet in the first table, generate relevant information of the uplink packet for the first table, and
calculate the expected latency, select the radio resource to be allocated to the terminal, and manage the communication unit to transmit information on the radio resource based on the generated relevant information.

7. The radio resource scheduling apparatus of claim 5, wherein the control unit is configured to:
update, upon determining to calculate the expected latency, select the radio resource to be allocated to the terminal, and manage the communication unit to transmit information on the radio resource, the relevant information stored in the first table corresponding to the uplink packet, and
delete, when determining not to calculate the expected latency, select the radio resource to be allocated to the terminal, and manage the communication unit to transmit information on the radio resource, the relevant information stored in the first table corresponding to the uplink packet.

8. The radio resource scheduling apparatus of claim 4, wherein the control unit is configured to:
calculate, upon receiving the uplink packet, relevant information of a specific uplink packet having a similar attribute to that of the uplink packet in the first table, and
select the radio resource to be allocated to the terminal based on information on radio resource allocation included in the calculated relevant information.

9. A method performed by a radio resource scheduling apparatus for scheduling and providing radio resources for a terminal that is linked with a radio access network (RAN) device, the method comprising:
receiving an uplink packet transmitted from the terminal to a server device via the RAN device;
calculating an expected latency from when the uplink packet is transferred from the RAN device to the server device to when a downlink packet is transferred in response to the uplink packet from the server device via the RAN device to the terminal; and
selecting a radio resource to be allocated to the terminal based on the expected latency, and transmitting information on the radio resource to be allocated for the terminal with information being carried on the uplink packet to the server device.

10. The method of claim 9, wherein the calculating comprises:
calculating the expected latency by using a latency information collected based on a previous uplink packet corresponding to the uplink packet, among other uplink packets transmitted before the uplink packet.

11. The method of claim 9, wherein the transmitting comprises:
calculating an average value of previous radio resources which have been allocated to the terminal in a time span between a current point in time and a specific previous point in time selected based on the expected latency, and
selecting the radio resource to be allocated to the terminal based on the average value.

12. The method of claim 9, further comprising:
determining, upon receiving the uplink packet, whether or not to perform the calculating and the transmitting, based on a first table that stores relevant information of the uplink packet transmitted from the terminal that is linked with the RAN device, and on a second table that stores execution conditions for transmitting the information on radio resource allocation after matching the execution conditions with each of packet types.

13. The method of claim 12, further comprising:
upon determining that no relevant information is present corresponding to the uplink packet in the first table, generating relevant information of the uplink packet for the first table, and
calculating the expected latency, selecting the radio resource to be allocated to the terminal, and transmitting the information on radio resource to be allocated to the terminal based on the generated relevant information.

14. The method of claim 12, further comprising:
updating, upon performing the calculating and the transmitting, the relevant information stored in the first table corresponding to the uplink packet, and
deleting, upon determining to not perform the calculating and the transmitting, the relevant information stored in the first table corresponding to the uplink packet.

15. The method of claim 12, further comprising
calculating, upon receiving the uplink packet, relevant information of a specific uplink packet having a similar attribute to that of the uplink packet in the first table, and
selecting the radio resource to be allocated to the terminal and transmitting the information on the radio resource to be allocated to the terminal at least partially based on information on radio resource allocation included in the calculated relevant information.

* * * * *